United States Patent
Miao et al.

(10) Patent No.: US 12,550,189 B2
(45) Date of Patent: Feb. 10, 2026

(54) METHODS FOR COMMUNICATION, TERMINAL DEVICE, NETWORK DEVICE, AND COMPUTER READABLE MEDIA

(71) Applicant: NEC CORPORATION, Tokyo (JP)

(72) Inventors: Zhaobang Miao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 411 days.

(21) Appl. No.: 17/794,463

(22) PCT Filed: Jan. 22, 2020

(86) PCT No.: PCT/CN2020/073896
§ 371 (c)(1),
(2) Date: Jul. 21, 2022

(87) PCT Pub. No.: WO2021/147028
PCT Pub. Date: Jul. 29, 2021

(65) Prior Publication Data
US 2023/0050353 A1    Feb. 16, 2023

(51) Int. Cl.
*H04W 74/0808* (2024.01)
*H04W 72/1263* (2023.01)

(52) U.S. Cl.
CPC ... *H04W 74/0808* (2013.01); *H04W 72/1263* (2013.01)

(58) Field of Classification Search
CPC ......... H04W 74/0808; H04W 72/1263; H04W 92/18; H04W 72/02; H04W 4/40;
(Continued)

(56) References Cited

U.S. PATENT DOCUMENTS

| 2020/0205165 A1* | 6/2020 | Huang | H04L 5/0051 |
| 2020/0296690 A1* | 9/2020 | Lee | H04W 4/40 |

(Continued)

FOREIGN PATENT DOCUMENTS

| CN | 109923906 A | 6/2019 |
| CN | 110662202 A | 1/2020 |

(Continued)

OTHER PUBLICATIONS

International Search Report for PCT/CN2020/073896, dated Oct. 27, 2020.
Written Opinion for PCT/CN2020/073896, dated Oct. 27, 2020.

*Primary Examiner* — Sudesh M. Patidar
(74) *Attorney, Agent, or Firm* — Sughrue Mion, PLLC

(57) ABSTRACT

Embodiments of the present disclosure provide a solution for sensing sidelink resources. In a method for communication, in accordance with receiving, at a terminal device from a network device, a first higher layer parameter indicating that partial sensing is enabled for the terminal device, the terminal device determines a candidate resource for performing a sidelink transmission in a target slot. The terminal device determines, for the partial sensing, a sensing window with a configured time length before the target slot. The terminal device determines, in the sensing window, a set of slots based on the configured time length of the sensing window. The terminal device determines a reservation state of the candidate resource by monitoring the set of slots. With the embodiments of the present disclosure, a feasible partial sensing procedure is provided for a terminal device to perform a sidelink transmission in the 5G NR, and thus the performance of sidelink transmissions can be improved.

2 Claims, 10 Drawing Sheets

(58) Field of Classification Search
CPC .......... H04W 4/42; H04W 4/44; H04W 4/46;
H04W 4/48; H04W 4/70; H04W 4/80;
G16Y 10/40; G16Y 40/10; G16Y 40/30;
G16Y 40/35; G16Y 40/40; G16Y 40/50;
G16Y 40/60; B60R 2300/00
See application file for complete search history.

(56) References Cited

U.S. PATENT DOCUMENTS

| | | | |
|---|---|---|---|
| 2020/0374861 A1* | 11/2020 | Shilov | H04W 4/46 |
| 2021/0219268 A1* | 7/2021 | Li | H04B 17/318 |
| 2022/0264542 A1* | 8/2022 | Thomas | H04W 74/002 |
| 2023/0066041 A1* | 3/2023 | Guo | H04W 52/0216 |

FOREIGN PATENT DOCUMENTS

| | | |
|---|---|---|
| EP | 3 522 630 A1 | 8/2019 |
| WO | 2017/146783 A1 | 8/2017 |
| WO | 2019/148506 A1 | 8/2019 |

\* cited by examiner

METHODS FOR COMMUNICATION, TERMINAL DEVICE, NETWORK DEVICE, AND COMPUTER READABLE MEDIA

CROSS REFERENCE TO RELATED APPLICATIONS

This application is a National Stage of International Application No. PCT/CN2020/073896 filed Jan. 22, 2020.

FIELD

Embodiments of the present disclosure generally relate to the field of communication, and in particular, to a solution for sensing sidelink resources.

BACKGROUND

The latest developments of the 3GPP standards are referred to as Long Term Evolution (LTE) of Evolved Packet Core (EPC) network and Evolved Universal Mobile Telecommunications System (UMTS) Terrestrial Radio Access Network (E-UTRAN), also commonly termed as '4G.' In addition, the term '5G New Radio (NR)' refers to an evolving communication technology that is expected to support a variety of applications and services. The 5G NR is part of a continuous mobile broadband evolution promulgated by the Third Generation Partnership Project (3GPP) to meet new requirements associated with latency, reliability, security, scalability (for example, with Internet of Things), and other requirements. Some aspects of the 5G NR may be based on the 4G Long Term Evolution (LTE) standards.

For sidelink transmissions in the 5G NR, sensing and resource (re-)selection related procedures are supported for resource allocation Mode 2. The sensing procedure considered is defined as decoding sidelink control information, SCI(s), from other UEs and/or sidelink (SL) measurements. Decoding SCI(s) in this procedure provides at least information on SL resources indicated by the UE transmitting the SCI. The sensing procedure uses a L1 SL Reference Signal Received Power (RSRP) measurement based on SL Demodulation Reference signal (DMRS) when the corresponding SCI is decoded. The resource (re-)selection procedure considered uses the results of the sensing procedure to determine resource(s) for SL transmission. Partial sensing means the sensing and selection occasions exist in a partial set of the predefined windows. However, partial sensing procedures for sidelink transmissions are not specified in the 5G NR, especially for configurable reservation periods and aperiodic traffic reservations.

SUMMARY

In general, example embodiments of the present disclosure provide a solution for sensing sidelink resources.

In a first aspect, there is provided a method for communication. The method comprises in accordance with receiving, at a terminal device from a network device, a first higher layer parameter indicating that partial sensing is enabled for the terminal device, determining a candidate resource for performing a sidelink transmission in a target slot. The method also comprises determining, for the partial sensing, a sensing window with a configured time length before the target slot. The method also comprises determining, in the sensing window, a set of slots based on the configured time length of the sensing window. The method further comprises determining a reservation state of the candidate resource by monitoring the set of slots.

In a second aspect, there is provided a method for communication. The method comprises determining, at a network device, a first higher layer parameter indicating whether partial sensing is enabled for a terminal device. The method also comprises transmitting the first higher layer parameter to the terminal device.

In a third aspect, there is provided a terminal device. The terminal device comprises a processor and a memory storing instructions. The memory and the instructions are configured, with the processor, to cause the terminal device to perform the method according to the first aspect.

In a fourth aspect, there is provided a network device. The network device comprises a processor and a memory storing instructions. The memory and the instructions are configured, with the processor, to cause the network device to perform the method according to the second aspect.

In a fifth aspect, there is provided a computer readable medium having instructions stored thereon. The instructions, when executed on at least one processor of a device, cause the device to perform the method according to the first aspect.

In a sixth aspect, there is provided a computer readable medium having instructions stored thereon. The instructions, when executed on at least one processor of a device, cause the device to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein.

Throughout the drawings, the same or similar reference numerals represent the same or similar elements.

DETAILED DESCRIPTION OF EMBODIMENTS

Figure 1:
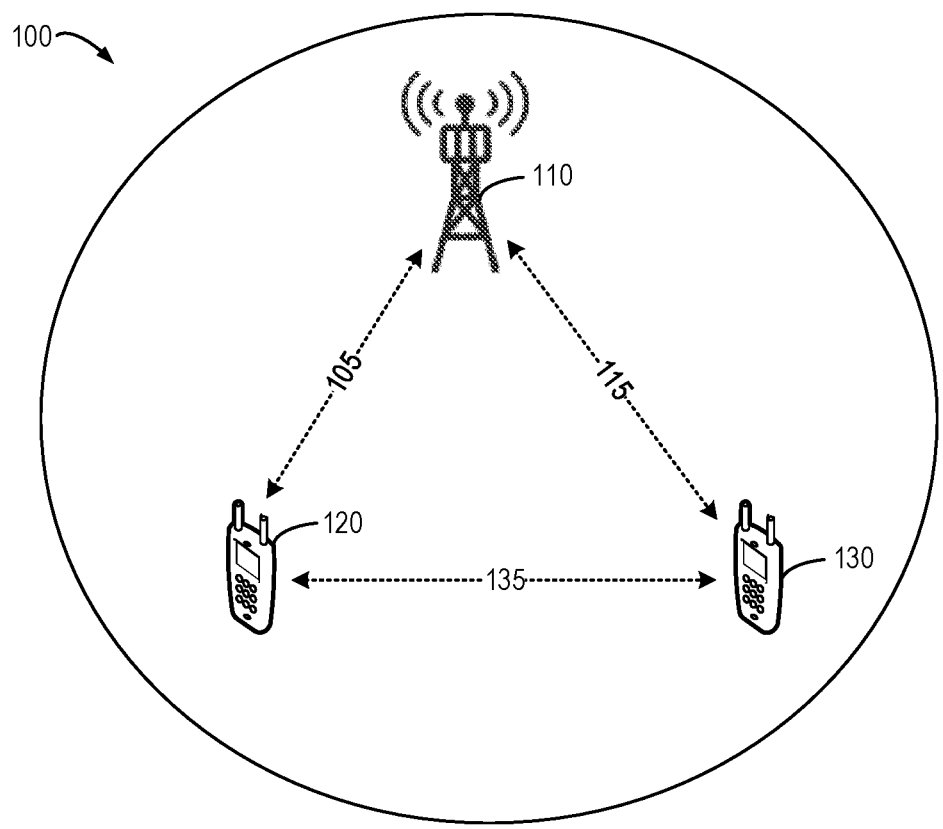
FIG. 1 is a schematic diagram of a communication environment in which some embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can perform communications. Examples of a network device include, but not limited to, a Node B (NodeB or NB), an Evolved NodeB (eNodeB or eNB), a next generation NodeB (gNB), an infrastructure device for a V2X communication, a Transmission/Reception Point (TRP), a Remote Radio Unit (RRU), a radio head (RH), a remote radio head (RRH), a low power node such as a femto node, a pico node, and the like.

As used herein, the term "terminal device" refers to any device having wireless or wired communication capabilities. Examples of the terminal device include, but not limited to, user equipment (UE), vehicle-mounted terminal devices, devices of pedestrians, roadside units, personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, some embodiments will be described with reference to UEs as examples of terminal devices and the terms "terminal device" and "user equipment" (UE) may be used interchangeably in the context of the present disclosure.

In one embodiment, a terminal device may be connected with a first network device and a second network device. One of the first network device and the second network device may be a master node and the other one may be a secondary node. The first network device and the second network device may use different radio access technologies (RATs). In one embodiment, the first network device may be a first RAT device and the second network device may be a second RAT device. In one embodiment, the first RAT device is an eNB and the second RAT device is a gNB.

Information related to different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related to configuration for the terminal device configured by the second network device may be transmitted from the second network device via the first network device. Information related to reconfiguration for the terminal device configured by the second network device may be transmitted to the terminal device from the second network device directly or via the first network device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

As indicated, partial sensing procedures for sidelink transmissions are not specified in the 5G NR, especially for configurable reservation periods and aperiodic traffic reservations. In particular, NR sidelink enhancement may include resource allocation enhancement to specify resource allocation to reduce power consumption of the UEs. sidelink random resource selection and partial sensing to NR sidelink resource allocation mode 2 may be considered. It is noted that introducing a new solution to reduce power consumption for the cases where above methods cannot work properly.

In addition, in one situation, when reservation of a sidelink resource for an initial transmission of a TB at least by an SCI associated with a different TB is disabled, $N_{MAX}$ is 3. SCI signaling is designed to allow to indicate 1 or 2 or 3 resources at least of the same number of sub-channels with full flexibility in time and frequency position in a window W of a resource pool. Value 2 or 3 is (pre-)configured per resource pool. Size of window W may be further considered.

Moreover, in one situation, on a per resource pool basis, when reservation of a sidelink resource for an initial transmission of a TB at least by an SCI associated with a different TB is enabled: a period is additionally signaled in SCI and the same reservation is applied with respect to resources indicated within $N_{MAX}$ within window W at subsequent periods; a set of possible period values is the following: 0, [1: 99], 100, 200, 300, 400, 500, 600, 700, 800, 900, 1000 millisecond (ms). For example, equal to or less than 4 bits are used in SCI to indicate a period. Alternatively or additionally, an actual set of values is (pre-)configured.

Regarding the number of periods, the number of remaining periodic reservations is not explicitly indicated in SCI. In one situation, procedure of mapping of periodic semi-persistent resources into the resource selection window may be reused from LTE about non-partial sensing. In one situation, procedure of triggering periodic semi-persistent resources reselection based on reselection counter and keep probability may be reused from LTE. By reusing definition and procedure of $C_{resel}$ defined in TS 36.213, the procedure may be applicable. Procedure of using sidelink RSSI for ranking of resources is not applied. In one situation, T0 may be (pre)-configured between: 1000+[100] ms and [100] ms. W may be equal to 32 slots.

From the above, the inventors identify that reusing Rel-14 partial sensing for NR V2X cannot work properly, some problems to be solved. For example, LTE sensing is designed for periodic traffic, how to handle aperiodic traffic in NR is unclear. In particular, for the reservation and sensing in LTE, repetition transmissions are supported by using parameters "Time gap" and "Re-TX Indication." Periodic traffic is supported by using a parameter "Reservation interval." Sensing window is fixed to be 1000 ms. 10 reservation periods of 100:1000 for P-UE are supported. Partial sensing should get all reservation information of the resource. The reservation information of a candidate resource in subframe Y is transmitted in subframes Y-M, M could be 100, 200, . . . , 1000. 10-bits gapCandidateSensing-r14 is used to indicate value M.

In contrast, there are two cases in reservation in NR. In Case 1, SCI signaling is designed to allow to indicate 1 or 2 or 3 resources at least of the same number of sub-channels with full flexibility in time and frequency position in a window W of a resource pool. In Case 2, a period is additionally signaled in SCI and the same reservation is applied with respect to resources indicated within $N_{MAX}$ within window W at subsequent periods. In addition, sensing window is configured between [100] ms and 1000+[100] ms. Allowed period values (equal to or less than 16 values) are configured from 0, [1: 99], 100, 200, . . . , 1000 ms.

In reusing LTE partial sensing in NR, the baseline is to introduce the principle of Rel-14 LTE sidelink partial sensing to Rel-16 NR sidelink resource allocation mode 2. Therefore, there are some problems to be solved. For case 1 where sensing window is [100] ms for aperiodic traffic. Slots Y−[100, 200, . . . , 1000] in LTE method are beyond the sensing window, which cannot detect the aperiodic traffic reservation. For case 2 where sensing window is 1000+[100] ms and the allowed periods are configured from 0, [1: 99], 100, 200, . . . , 1000, slots Y−[100, 200, . . . , 1000] in LTE method cannot detect all the possible reservation information. For example, [1: 99]-periodic reservation and aperiodic reservation. In summary, partial sensing in Rel.16 NR is not defined by now. Reusing Rel.14 LTE partial sensing for NR V2X cannot make the NR partial sensing procedure work properly.

In order to solve the above technical problems and potentially other technical problems in conventional solutions, embodiments of the present disclosure provide a solution for sensing sidelink resources. In some embodiments, a partial sensing procedure for sidelink transmissions is specified, especially for configurable reservation periods and aperiodic traffic reservations. With embodiments of the present disclosure, a feasible partial sensing procedure is provided for a terminal device to perform a sidelink transmission in the 5G NR, and thus the performance of sidelink transmissions can be improved. Principles and implementations of the present disclosure will be described in detail below with reference to the figures.

FIG. 1 is a schematic diagram of a communication environment 100 in which some embodiments of the present disclosure can be implemented. As shown in FIG. 1, the communication environment 100, which may also be referred to as a communication network 100, includes a network device 110 serving a first terminal device 120 and a second terminal device 130. In particular, the first terminal device 120 may communicate with the network device 110 via a communication channel 105, and the second terminal device 130 may communicate with the network device 110 via a communication channel 115.

For transmissions from the network device 110 to the first terminal device 120 or the second terminal device 130, the communication channel 105 or 115 may be referred to as a downlink channel, whereas for transmissions from the first terminal device 120 or the second terminal device 130 to the network device 110, the communication channel 105 or 115. In the following, the first terminal device 120 and the second terminal device 130 can also be referred to as the terminal device 120 and the terminal device 130 for simplicity.

Additionally, the first terminal device 120 may communicate with the second terminal device 130 via a device-to-device (D2D) channel 135, which may also be referred to as a sidelink channel 135. In some cases, the network device 110 may be absent in the communication environment 100. For example, one or more of the first terminal device 120, the second terminal device 130 and other terminal devices (not shown) may be out of the coverage of the network device 110. In such cases, only sidelink communications exist between the first terminal device 120 and the second terminal device 130 as well as possibly other terminal devices not shown in FIG. 1.

In some embodiments, during a sidelink communication between the first terminal device 120 and the second terminal device 130 via the sidelink channel 135, the first terminal device 120 can perform a sidelink transmission to the second terminal device 130 using a set of transmission resources. As used herein, the term "sidelink transmission" generally refers to any transmission performed from one terminal device to another terminal device via a sidelink channel between them. The sidelink transmission may be used for transmitting any data or control information associated with sidelink communications, for example, sidelink data or sidelink control information or sidelink feedback information. As used herein, the term "sidelink channel" may generally refer to any channels for sidelink communications, for example, Physical Sidelink Shared Channel (PSSCH), Physical Sidelink Control Channel (PSCCH), Physical Sidelink Discovery Channel (PSDCH), Physical Sidelink Broadcast Channel (PSBCH), Physical Sidelink Feedback Channel (PSFCH), and other existing or future sidelink channels.

As used herein, the term "resource," "transmission resource," or "sidelink resource" may refer to any resource for performing a communication, for example, a sidelink communication between terminal devices, such as a resource in time domain (for example, a time slot), a resource in frequency domain (for example, a sub-channel), a resource in space domain, a resource in code domain, or any other resource enabling a communication, and the like. In the following, a resource in both frequency domain and time domain may be used as an example of a sidelink resource for describing some embodiments of the present disclosure. However, it is noted that embodiments of the present disclosure are equally applicable to any other resources in any other domains.

Although the network device 110, the first terminal device 120 and the second terminal device 130 are described in the communication environment 100 of FIG. 1, embodiments of the present disclosure may be equally applicable to any other suitable communication devices in communication with one another. That is, embodiments of the present disclosure are not limited to the example scenario of FIG. 1. In this regard, it is noted that although the first and second terminal devices 120 and 130 are schematically depicted as mobile phones in FIG. 1, it is understood that this depiction is only for example without suggesting any limitation. In other embodiments, the first and second terminal devices 120 and 130 may be any other wireless communication devices, for example, vehicle-mounted terminal devices.

In case the first and second terminal devices 120 and 130 are vehicle-mounted terminal devices, the communications relate to them may be referred to as V2X communications. More generally, although not shown in FIG. 1, a V2X communication related to the first and second terminal devices 120 and 130 may comprise a communication between the first or second terminal devices 120 or 130 and any other communication device, including but not limited to, an infrastructure device, another vehicle-mounted terminal device, a device of a pedestrian, a roadside unit, or the like. Furthermore, although not shown, all the communication links as shown in FIG. 1 may be via one or more relays.

It is to be understood that the number of the terminal devices and the number of the network devices as shown in FIG. 1 are only for the purpose of illustration without suggesting any limitations. The communication environment 100 may include any suitable number of terminal devices, any suitable number of network devices, and any suitable number of other communication devices adapted for implementing embodiments of the present disclosure. In addition, it would be appreciated that there may be various wireless communications as well as wireline communications (if needed) among all the communication devices.

The communications in the communication environment 100 may conform to any suitable standards including, but not limited to, Global System for Mobile Communications (GSM), Extended Coverage Global System for Mobile Internet of Things (EC-GSM-IoT), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

Figure 2:
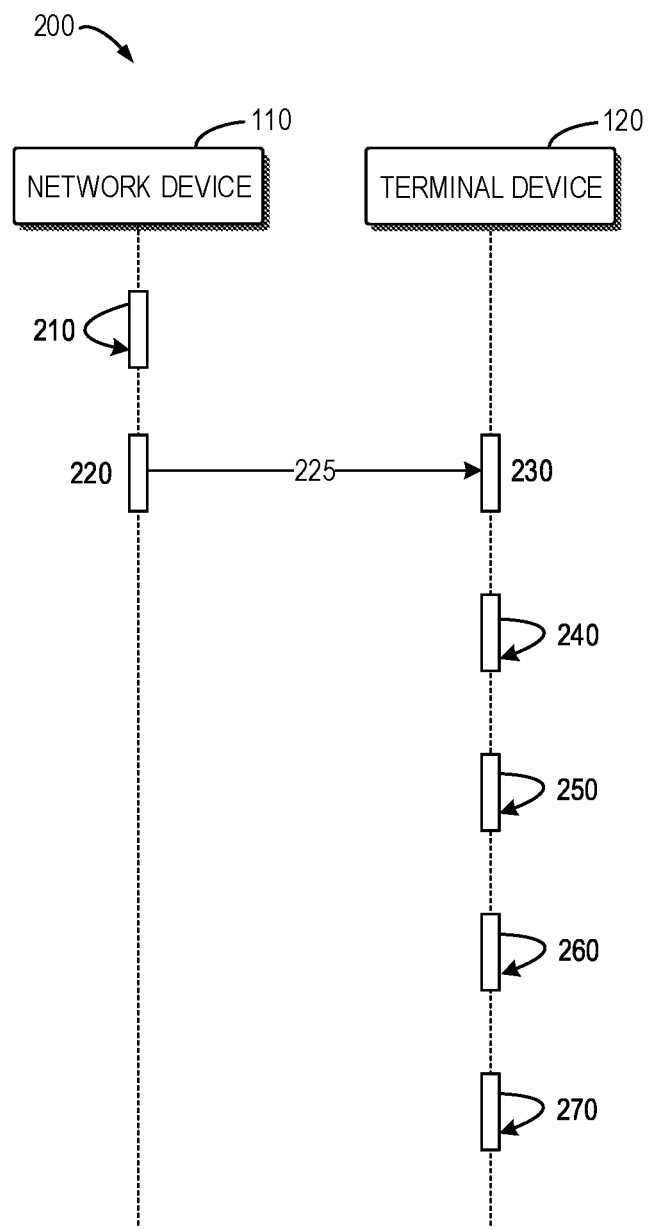
FIG. 2 illustrates an example communication process between a network device and a terminal device in accordance with some embodiments of the present disclosure.

FIG. 2 illustrates an example communication process 200 between the network device 110 and the terminal device 120 in accordance with some embodiments of the present disclosure. For the purpose of discussion, the communication process 200 will be described with reference to FIG. 1. However, it would be appreciated that the communication process 200 may be equally applicable to other communication scenarios where a network device and a terminal device communicate with each other.

As shown in FIG. 2, the network device 110 determines at 210 a first higher layer parameter 225, which indicates whether partial sensing is enabled for the terminal device 120. For example, the first higher layer parameter 225 may indicate that the partial sensing is enabled for the terminal device 120. Alternatively, the first higher layer parameter 225 can indicate that the partial sensing is disabled for the terminal device 120. In some embodiments, the first higher layer parameter 225 can also be referred to as "partialsensingenable" and may have two values, namely, "True" and "False." The "True" value represents enabling of the partial sensing, and the "False" represents disabling of the partial sensing. Alternatively, the fact that the first higher layer parameter 225 is presented (for example, in an RRC message) may mean the enabling of the partial sensing. Otherwise, the fact that the first higher layer parameter 225 is absent (for example, in the RRC message) can mean the disabling of the partial sensing.

In some embodiments, the first higher layer parameter 225 may be predefined, for example, by the network device 110 and may be transmitted to the terminal device 120 via an RRC message. In some other embodiments, the first higher layer parameter 225 can be configured by the network device 110 and may be carried in any other existing or future signaling or messages.

Continuing with reference to FIG. 2, after determining at 210 the first higher layer parameter 225, the network device 110 transmits at 220 the first higher layer parameter 225 to the terminal device 120, to inform that the partial sensing is enabled for the terminal device 120. In this event, the terminal device 120 can perform the partial sensing associated with a candidate resource for performing a sidelink transmission. In the partial sensing, in order to determine whether the candidate resource is reserved by a further terminal device, the terminal device 120 may need to monitor a set of slots in which the further terminal device may transmit reservation information to reserve the candidate resource. This is described in detail below with reference to FIG. 3.

Figure 3:
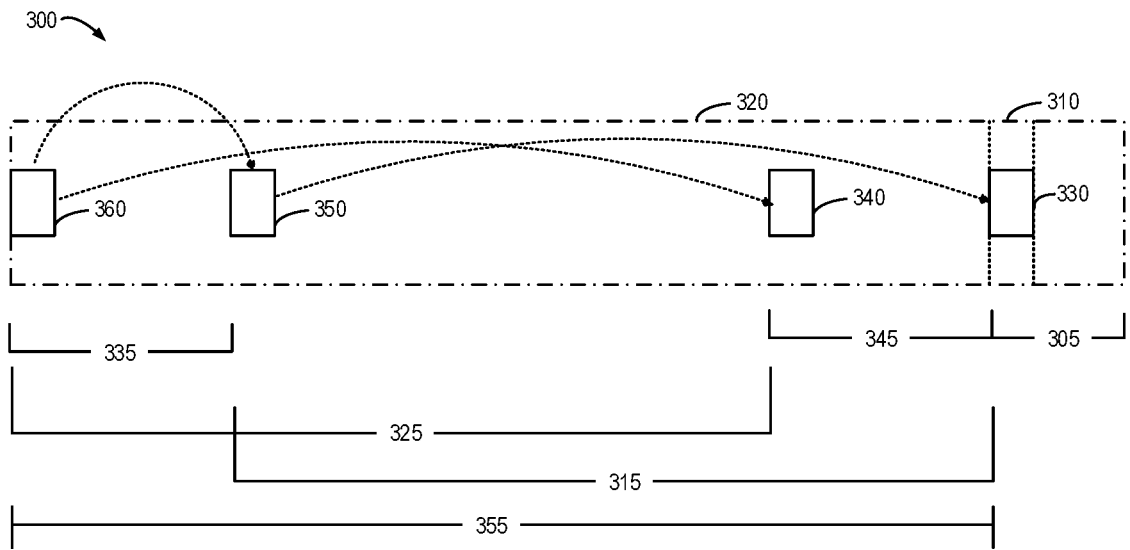
FIG. 3 illustrates an example of a periodic resource reservation in accordance with some embodiments of the present disclosure.

FIG. 3 illustrates an example of a periodic resource reservation 300 in accordance with some embodiments of the present disclosure. As shown in FIG. 3, it is assumed that the terminal device 120 selects a resource 330 in a target slot 310 as a candidate resource for performing a sidelink transmission. As used herein, a slot generally refers to a time unit defined for sidelink transmissions and is specified by 3GPP specifications or any other applicable standards. In some embodiments, the target slot 310 refers to the slot including the resource 330, and the resource 330 corresponds to a slot in time domain and a subset of available sub-channels in the target slot 310.

In case the resource 330 is a candidate resource, the set of slots to be monitored by the terminal device 120 can be determined within a sensing window 320. In particular, in the periodic resource reservation 300, the further terminal device may transmit reservation information using the resource 350 to reserve the resource 330. The interval 315 between the resource 350 and the resource 330 may be referred to as a resource reservation period, which can be indicated by a higher layer.

In some embodiments, the resource 350 can in turn be reserved by the further terminal device using a resource 360 before the resource 350. The interval 335 between the resource 360 and the resource 350 may be referred to as a reservation interval window W, which can be equal to or less than [100] ms or 32 sidelink slots, for example. In other embodiments, other values for the reservation interval window W are possible. In a way similar to that the resource 350 is used to reserve the resource 330 in the periodic resource reservation 300, the resource 360 can be used to reserve the resource 340. Therefore, the interval 325 between the resource 360 and the resource 340 may be the same as the interval 315, and the interval 345 between the resource 340 and the resource 330 may be the same as the interval 335. In addition, in some embodiments, the frequency domain positions of the resources 330, 340, 350, and 360 may be different from each other.

With reference to both FIGS. 2 and 3, after receiving at 230 the first higher layer parameter 225 which indicates the partial sensing is enabled, the terminal device 120 determines at 240 the candidate resource 330 for performing a sidelink transmission in the target slot 310. In general, the terminal device 120 can select any available resource in any target slot for performing the sidelink transmission. In some embodiments, the terminal device 120 may select the target slot 310 from a time interval 305 including a number of slots. As used herein, the time interval 305 may also be referred to as a time window, a duration, or a set of slots. It should be noted that although the target slot 310 is depicted at the beginning of the time interval 305, the target slot 310 can be in any position in the time interval 305. An example of such embodiments is described in detail below with reference to FIG. 10.

Continuing with reference to FIGS. 2 and 3, for the partial sensing, the terminal device 120 determines at 250 the sensing window 320 with a configured time length 355 before the target slot 310. As mentioned, the set of slots to be monitored by the terminal device 120 for the candidate resource 330 may be within the sensing window 320. Therefore, in order to monitor the set of slots, the terminal device 120 can first determine the sensing window 320. In some embodiments, the sensing window 320 may have a plurality of available time lengths, for example, a first predefined value of 1000+[100] ms, a second predefined value of [100] ms, and other possible predefined values. In such embodiments, the terminal device 120 may determine the set of slots in different manners for different values of the configured time length 355 of the sensing window 320.

In particular, based on the configured time length 355 of the sensing window 320, the terminal device 120 determines at 260 the set of slots to be monitored in the sensing window 320. As noted above, different configured time lengths of the sensing window 320 may indicate different reservation manners that may be used by other terminal devices sharing the same resource pool for sidelink transmissions with the terminal device 120. Therefore, the terminal device 120 may determine at 260 the set of slots in different ways for different values of the configured time length 355 of the sensing window 320. Some examples of such embodiments are described in detail below with reference to FIGS. 3 to 9.

Afterwards, the terminal device 120 determines at 270 a reservation state of the candidate resource 330 by monitoring the set of slots. For example, if the terminal device 120 does not detect, in the set of slots, reservation information (for example, in sidelink control information, SCI, from a further terminal device) on the candidate resource 330, the terminal device 120 can determine the reservation state of the candidate resource 330 as unreserved. In contrast, if the terminal device 120 detects, in any of the set of slots, reservation information (for example, in sidelink control information, SCI, from a further terminal device) on the candidate resource 330, the terminal device 120 can determine the reservation state of the candidate resource 330 as reserved.

Accordingly, the terminal device 120 may determine whether to use the candidate resource 330 to perform a sidelink transmission based on the reservation state of the candidate resource 330. With the communication process 200, a feasible partial sensing procedure is provided for a terminal device to perform a sidelink transmission in the 5G NR, and thus the performance of sidelink transmissions can be improved.

As described, the sensing window 320 may have various available time lengths. In some embodiments, the network device 110 can configure the time length 355 of the sensing window 320, and inform of the terminal device 120 the configured time length 355 of the sensing window 320. In this way, the configuration flexibility of a time length of a sensing window for a terminal device to perform partial sensing can be improved. Such an example will be described in detail below with reference to FIG. 4.

Figure 4:
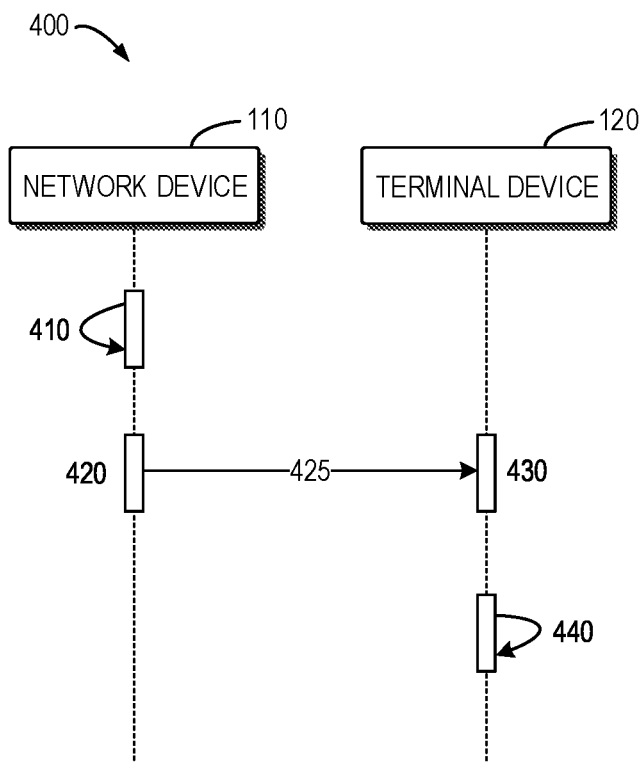
FIG. 4 illustrates another example communication process between a network device and a terminal device in accordance with some embodiments of the present disclosure.

FIG. 4 illustrates another example communication process 400 between the network device 110 and the terminal device 120 in accordance with some embodiments of the present disclosure. For the purpose of discussion, the communication process 400 will be described with reference to FIG. 1. However, it would be appreciated that the communication process 400 may be equally applicable to other communication scenarios where a network device and a terminal device communicate with each other.

As shown in FIG. 4, the network device 110 can select at 410 a configured time length from a plurality of time lengths available for the sensing window 320 for the partial sensing. Afterwards, the network device 110 may transmit at 420, to the terminal device 120, a second higher layer parameter 425, which indicates the configured time length of the sensing window 320. In some embodiments, the second higher layer parameter 425 can also be referred to as "t0_SensingWindow" and may have at least two predefined values, for example, "1000+[100] ms" and "[100] ms." In some embodiments, the value "1000+[100] ms" may indicate that a periodic resource reservation or both a periodic and an aperiodic resource reservations are configured for terminal devices, and the value "[100] ms" may imply an aperiodic resource reservation is configured for terminal devices.

In some embodiments, the second higher layer parameter 425 may be predefined, for example, by the network device 110 and may be transmitted to the terminal device 120 via an RRC message. In some other embodiments, the second higher layer parameter 425 can be configured by the network device 110 and may be carried in any other existing or future signaling or messages.

With reference to both FIGS. 2 and 4, in determining at 250 the sensing window 320, the terminal device 120 may receive at 430 the second higher layer parameter 425 from the network device 110. Then, the terminal device 120 may determine at 440 the configured time length 355 of the sensing window 320 from the second higher layer parameter 425. Accordingly, based on the configured time length 355 indicated in the second higher layer parameter 425, the terminal device 120 can determine at 260 the set of slots to be monitored.

In other words, the partial sensing procedure for NR V2X may be dependent on the second higher layer parameter 425, t0_SensingWindow. More particularly, when t0_SensingWindow is configured with 1000+[100] ms, a sensing occasion may be determined by a third higher layer parameter and a maximum reservation interval window, for example, W=32 slots. The third higher layer parameter may also be referred to as "reservationPeriodAllowed," which indicates a set of resource reservation periods and will be described below with reference to FIG. 5.

Figure 5:
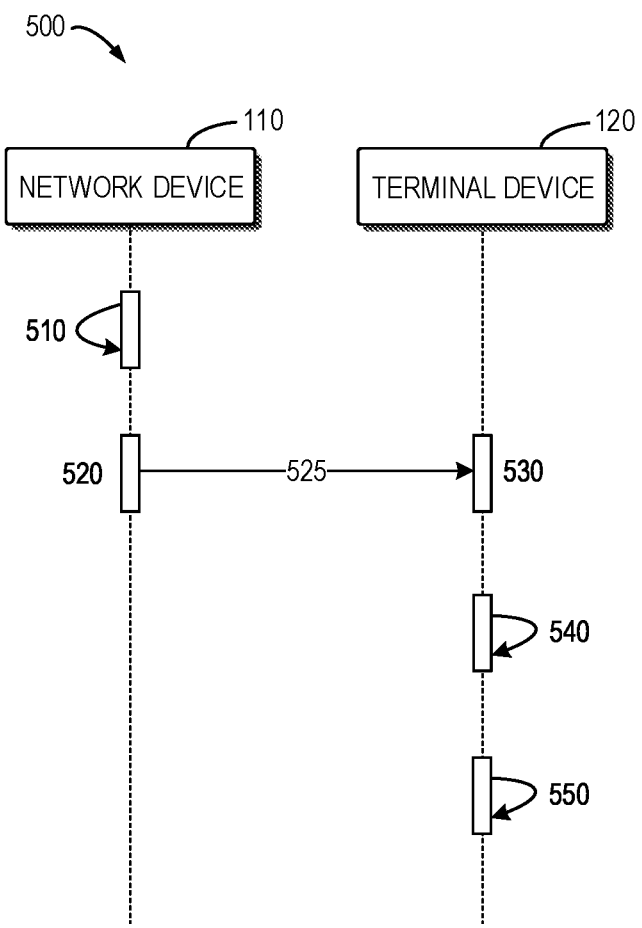
FIG. 5 illustrates another example communication process between a network device and a terminal device in accordance with some embodiments of the present disclosure.

FIG. 5 illustrates another example communication process 500 between the network device 110 and the terminal device 120 in accordance with some embodiments of the present disclosure. For the purpose of discussion, the communication process 500 will be described with reference to FIG. 1. However, it would be appreciated that the communication process 500 may be equally applicable to other communication scenarios where a network device and a terminal device communicate with each other.

As shown in FIG. 5, the network device 110 may determine at 510 a third higher layer parameter 525, which indicates a set of resource reservation periods for the partial sensing. In some embodiments, the third higher layer parameter 525 can also be referred to as "reservationPeriodAllowed" and may indicate one or more of a plurality of predefined values, for example, 0, [1: 99], 100, 200, 300, 400, 500, 600, 700, 800, 900, 1000 ms, or the like. Each of the values may represent a particular period of a periodic resource reservation for a terminal device to perform a resource reservation.

In some embodiments, the third higher layer parameter 525 may be predefined, for example, by the network device 110 and may be transmitted to the terminal device 120 via an RRC message. In some other embodiments, the third higher layer parameter 525 can be configured by the network device 110 and may be carried in any other existing or future signaling or messages. After determining at 510 the third higher layer parameter 525, the network device 110 may transmit at 520 the third higher layer parameter 525 to the terminal device 120.

With reference to both FIGS. 2 and 5, in determining at 260 the set of slots to be monitored, the terminal device 120 may receive at 530 the third higher layer parameter 525 from the network device 110. Thus, in case that the configured time length 355 of the sensing window 320 is the first predefined value (for example, 1000+[100] ms), the terminal device 120 may determine at 540 a resource reservation period from the third higher layer parameter 525, for example, one of the set of resource reservation periods. In other words, from the third higher layer parameter 525, the terminal device 120 may determine a set of resource reservation periods including the resource reservation period (for example, equal to the interval 315 in FIG. 3) which is used to determine the slot including the resource 350 before the target slot 310, which can be referred to as a first slot in the set of slots in the following. In this way, the configuration flexibility of the resource reservation periods can be improved.

Then, the terminal device 120 may determine 550 the first slot including the resource 350 in the set of slots based on the resource reservation period 315 and the target slot 310. For example, the first slot including the resource 350 can be determined as the slot before the target slot 310 by the resource reservation period 315. Through the communication process 500, the terminal device 120 can determine to monitor the set of slots based on a periodic resource reservation implicitly indicated by the first predefined value of the configured time length 355 of the sensing window 320, so that the sensing procedure can be simplified.

As described above, there is a possibility that a further terminal device reserves a resource in the first slot including the resource 350 using a resource in a slot (for example, the slot including the resource 360) selected from consecutive slots preceding the first slot including the resource 350. In the meanwhile, the resource in the slot including the resource 360 may further indicate the candidate resource 330 is also reserved together with the first slot including the resource 350.

Therefore, in order to also account for such a reservation possibility, the terminal device 120 may determine the consecutive slots preceding the first slot including the resource 350 in the sensing window 320 as slots in the set to be monitored. As such, the set of slots to be monitored may be more complete and the accuracy of the reservation state of the candidate resource may be improved. In some embodiments, the number of the consecutive slots may be 32. However, other numbers are possible in other embodiments.

Alternatively, instead of determining all the consecutive slots as the set of slots to be monitored, the terminal device 120 can determine a portion of the consecutive slots preceding the first slot including the resource 350 as the set of slots. In this way, the configuration flexibility of the consecutive slots to be monitored can be improved. Such an example will be described in detail with reference to FIG. 6.

Figure 6:
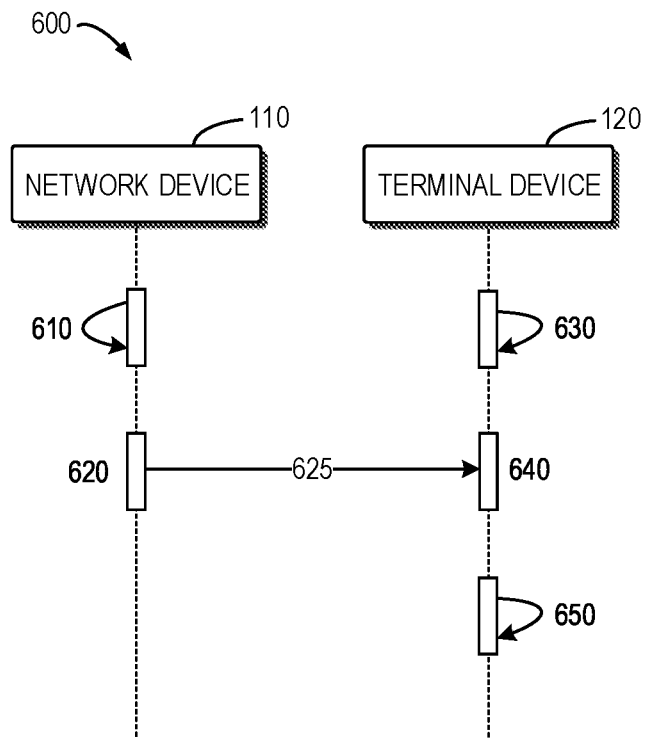
FIG. 6 illustrates another example communication process between a network device and a terminal device in accordance with some embodiments of the present disclosure.

FIG. 6 illustrates another example communication process 600 between the network device 110 and the terminal device 120 in accordance with some embodiments of the present disclosure. For the purpose of discussion, the communication process 600 will be described with reference to FIG. 1. However, it would be appreciated that the communication process 600 may be equally applicable to other communication scenarios where a network device and a terminal device communicate with each other.

As shown in FIG. 6, the network device 110 may determine at 610 a fourth higher layer parameter 625, which indicates a portion of the consecutive slots in the sensing window 320 preceding the first slot including the resource 350. In some embodiments, the fourth higher layer parameter 625 can also be referred to as "candidateSensing" and may indicate one or more of the consecutive slots preceding the first slot including the resource 350, for example, using a bit string (a bitmap). The bit string may have the same number of bits as the predefined number of the consecutive slots (for example, 32).

In some embodiments, the fourth higher layer parameter 625 may be predefined, for example, by the network device 110 and may be transmitted to the terminal device 120 via an RRC message. In some other embodiments, the fourth higher layer parameter 625 can be configured by the network device 110 and may be carried in any other existing or future signaling or messages. After determining at 610 the fourth higher layer parameter 625, the network device 110 may transmit at 620 the fourth higher layer parameter 625 to the terminal device 120, for example, via an RRC message.

With reference to both FIGS. 2 and 6, in determining at 260 the set of slots, the terminal device 120 may determine at 630 the consecutive slots in the sensing window 320 preceding the first slot including the resource 350. In addition, the terminal device 120 may receive at 640 the fourth higher layer parameter 625 from the network device 110, which can indicate a portion of the consecutive slots. Then, the terminal device 120 may determine 650 the portion of the consecutive slots as slots in the set to be monitored.

In some embodiments, the network device 110 can select some of the set of resource reservation periods indicated in the third higher layer parameter 525 for the terminal device 120 to perform the partial sensing. In this manner, the processing or power overhead for the terminal device 120 to perform the partial sensing may be reduced. This is described below with reference to FIG. 7.

Figure 7:
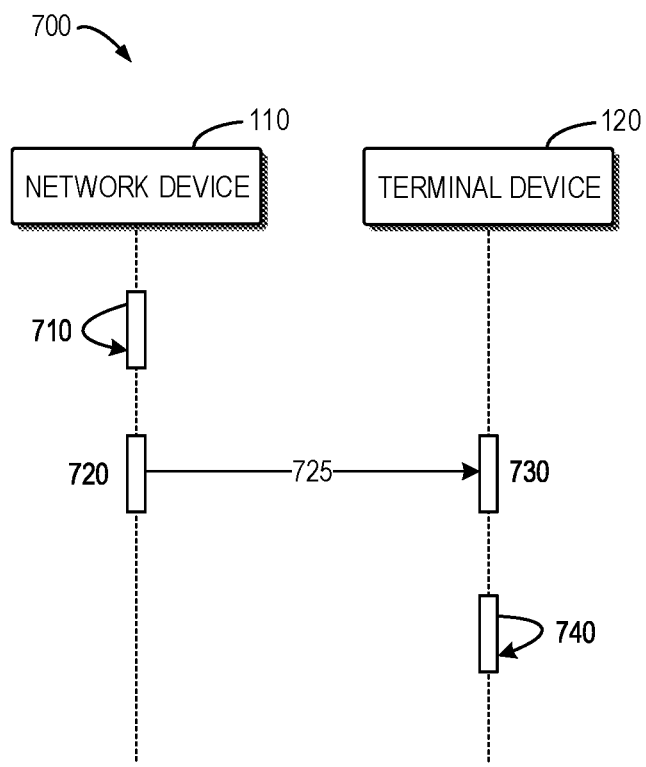
FIG. 7 illustrates another example communication process between a network device and a terminal device in accordance with some embodiments of the present disclosure.

FIG. 7 illustrates another example communication process 700 between the network device 110 and the terminal device 120 in accordance with some embodiments of the present disclosure. For the purpose of discussion, the communication process 700 will be described with reference to FIG. 1. However, it would be appreciated that the communication process 700 may be equally applicable to other communication scenarios where a network device and a terminal device communicate with each other.

As shown in FIG. 7, the network device 110 may determine at 710 a fifth higher layer parameter 725, which indicates a subset of the set of resource reservation periods as indicated in the higher layer parameter 525. In some embodiments, the fifth higher layer parameter 725 can also be referred to as "gapCandidateSensingNR" and may indicate one or more of the resource reservation periods as indicated in the third higher layer parameter 525, for example, using a bit string (a bitmap). The bit string may have a bit length of NreservPeriod, which is the number of allowed resource reservation periods indicated by the third higher layer parameter 525, namely, "reservationPeriodAllowed".

In some embodiments, the fifth higher layer parameter 725 may be predefined, for example, by the network device 110 and may be transmitted to the terminal device 120 via an RRC message. In some other embodiments, the fifth higher layer parameter 725 can be configured by the network device 110 and may be carried in any other existing or future signaling or messages. After determining at 610 the fifth higher layer parameter 725, the network device 110 may transmit at 720 the fifth higher layer parameter 725 to the terminal device 120.

Accordingly, the terminal device 120 may receive at 730 the fifth higher layer parameter 725 from the network device 110, which indicates the subset of the set of resource reservation periods for terminal devices to perform periodic resource reservations. Then, the terminal device 120 may determine at 740 slots in the set to be monitored, based on the subset of resource reservation periods and the target slot. For example, the terminal device 120 can determine respective slots in the set to be monitored, based on the respective resource reservation periods and the target slot.

In some embodiments, for the candidate resource 330 in the target slot 310 as shown in FIG. 3, there is a possibility that a further terminal device reserves the candidate resource 330 using an aperiodic resource reservation. In other words, the further terminal device may reserve the candidate resource 330 in the target slot 310 using a resource in a slot selected from consecutive slots preceding the target slot 310. This is described below in detail with reference to FIG. 8.

Figure 8:
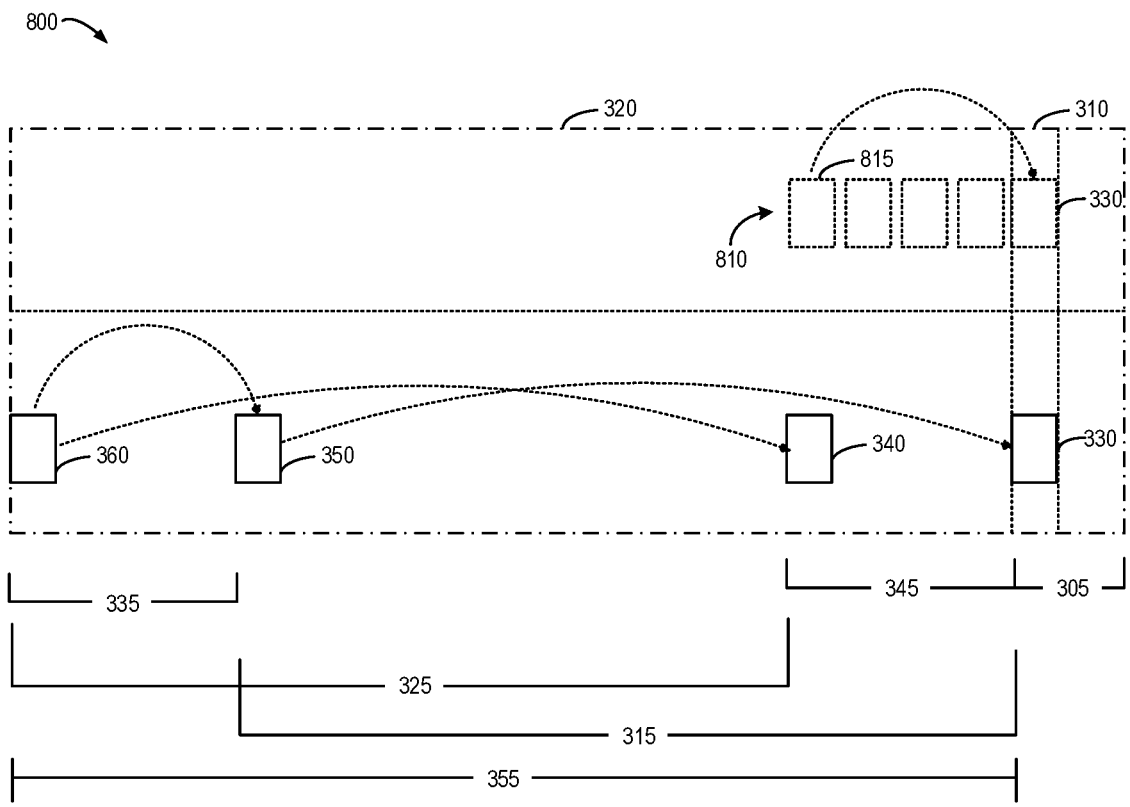
FIG. 8 illustrates an example of a mixed resource reservation including a periodic resource reservation and an aperiodic resource reservation in accordance with some embodiments of the present disclosure.

FIG. 8 illustrates an example of a mixed resource reservation 800 including a periodic resource reservation and an aperiodic resource reservation in accordance with some embodiments of the present disclosure. In addition to the depiction of FIG. 3, FIG. 8 also depicts consecutive slots including the resources 810 preceding the target slot 310 in the reservation interval window "W." In the aperiodic resource reservation, a further terminal device may transmit reservation information in any slot (for example, a slot including the resource 815) of the plurality of slots including the resources 810 to reserve the resource 330.

Since the range of the consecutive slots including the resources 810 is within the reservation interval window "W" before the target slot 310, the interval between the resource 815 and the resource 330 is equal to the interval 345. In some embodiments, the number of the consecutive slots may be 32. However, other numbers are possible in other embodiments. In addition, in some embodiments, the frequency domain positions of the resources 815 and 330 may be different from each other. In addition, it should be noted that although the target slot 310 is depicted at the beginning of the time interval 305, the target slot 310 can be in any position in the time interval 305.

Therefore, with reference to FIGS. 2 and 8, in order to also account for such a possibility of aperiodic resource reservations, the terminal device 120 may determine the consecutive slots including the resources 810 preceding the target slot 310 in the sensing window 320 as slots in the set to be monitored. As such, the set of slots to be monitored may be more complete and the accuracy of the reservation state of the candidate resource may be improved.

Alternatively, instead of determining all the consecutive slots as the set of slots to be monitored, the terminal device 120 can determine a portion of the consecutive slots preceding the target slot 310 as slots in the set of slots to be monitored. In this way, the configuration flexibility of the consecutive slots to be monitored can be improved.

In particular, in determining at 260 the set of slots, the terminal device 120 may first determine consecutive slots including the resources 810 in the sensing window 320 preceding the target slot 310. As described, the terminal device 120 may also receive the fourth higher layer parameter 625 from the network device 110, which also indicates a portion of the consecutive slots including the resources 810. Then, the terminal device 120 can determine the portion of the consecutive slots as slots in the set to be monitored.

Figure 9:
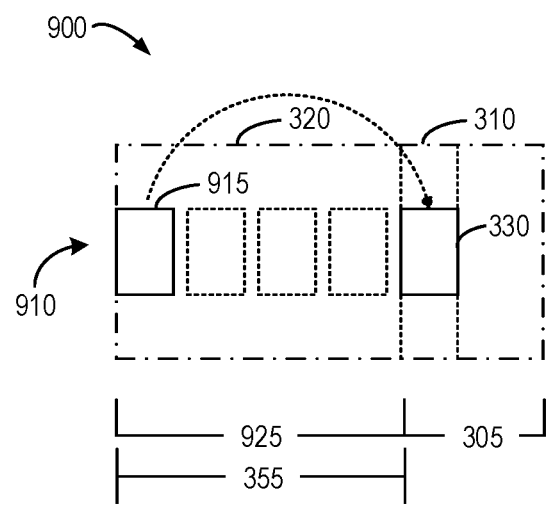
FIG. 9 illustrates an example of an aperiodic resource reservation in accordance with some embodiments of the present disclosure.

FIG. 9 illustrates an example of an aperiodic resource reservation 900 in accordance with some embodiments of the present disclosure. As shown in FIG. 9, it is still assumed that the terminal device 120 selects the resource 330 in the target slot 310 as a candidate resource for performing a sidelink transmission. In some embodiments, the terminal device 120 may select the target slot 310 from the time interval 305 including a number of slots. It should be noted that although the target slot 310 is depicted at the beginning of the time interval 305, the target slot 310 can be in any position in the time interval 305. An example of such embodiments is described in detail below with reference to FIG. 10. In case the resource 330 is a candidate resource, the set of slots to be monitored by the terminal device 120 can be determined within the sensing window 320.

Different from the scenarios as shown in FIGS. 3 and 8, FIG. 9 shows an aperiodic resource reservation 900 using the sensing window 320 with a second predefined value, for example, [100] ms, which is different from the first predefined value, for example, 1000+[100] ms. That is, the sensing window 320 has a shorter time length 355 compared to the sensing window 320 in FIGS. 3 and 8.

In the example of FIG. 9, the sensing window 320 may include a plurality of slots including the resources 910. In the aperiodic resource reservation 900, a further terminal device may transmit reservation information in any slot (for example, a slot including the resource 915) of the plurality of slots including the resources 910 within the sensing window 320 to reserve the resource 330. The interval 925 between the resource 915 and the resource 330 may be equal to the reservation interval window "W" as described with reference to FIGS. 3 and 8. In other words, the interval 925 may be equal to the intervals 345 and 355. In addition, in some embodiments, the frequency domain positions of the resources 915 and 330 may be different from each other.

With reference to both FIGS. 2 and 9, if the configured time length 355 of the sensing window 320 (for example, indicated by the second higher layer parameter 425) is the second predefined value, in determining at 260 the set of slots, the terminal device may determine consecutive slots including the resources 910 in the sensing window 320 as the set of slots, which consecutive slots preceding the target slot 310 include the resources 910.

In other words, the terminal device 120 can determine all the slots in the sensing window 320 as the set of slots. As such, the terminal device 120 can determine to monitor the set of slots based on an aperiodic resource reservation implicitly indicated by the second predefined value of the configured time length 355 of the sensing window 320, so as to simplify the sensing procedure and reduce the processing or power overhead for performing the partial sensing. In some embodiments, the number of the consecutive slots including the resources 910 may be 32. However, other numbers are possible in other embodiments.

Alternatively, instead of determining all the slots in the sensing window 320 as the set of slots, the terminal device 120 can determine a portion of the consecutive slots including the resources 910 in the sensing window 320 as the set of slots. In particular, if the configured time length 355 is the second predefined value, the terminal device 120 may first determine the consecutive slots including the resources 910 in the sensing window 320 preceding the target slot 310.

In addition, as described above, the terminal device 120 may receive the fourth higher layer parameter 625 from the network device 110. The fourth higher layer parameter 625 may also indicate a portion of the consecutive slots including the resources 910, for example, in a same way as indicating a portion of the consecutive slots including the resources 810 or indicating a portion of the consecutive slots before the first slot including the resource 350 as shown in FIGS. 3 and 8. Then, the terminal device 120 may determine the portion of the consecutive slots including the resources 910 indicated by the fourth higher layer parameter 625 as the set of slots. In this way, the configuration flexibility of the consecutive slots to be monitored can be improved.

Alternatively, if the configured time length 355 of the sensing window 320 is a second predefined value, the terminal device 120 may determine that the partial sensing is disabled for the terminal device 110, irrespective of the partial sensing being enabled by a higher layer or not. In this way, more potential available resources can be sensed by the terminal device 120 using a full resource sensing procedure.

In summary, when the second higher layer parameter 425, t0_SensingWindow, is configured with [100] ms, there are two options for the terminal device 110. The first option is that a sensing occasion is determined by max reservation interval window (for example, W=32 slots). The second option is to disable the partial sensing in UE regardless of the partial sensing being enabled by higher layer or not.

As mentioned above, in some embodiments, when selecting the target slot 310, the terminal device 120 may select a set of target slots including the target slot 310 from a time interval 305 including a number of slots. In this way, the terminal device 120 can select more target slots to sense more potential available resources. An example of such embodiments is described in detail below with reference to FIG. 10.

Figure 10:
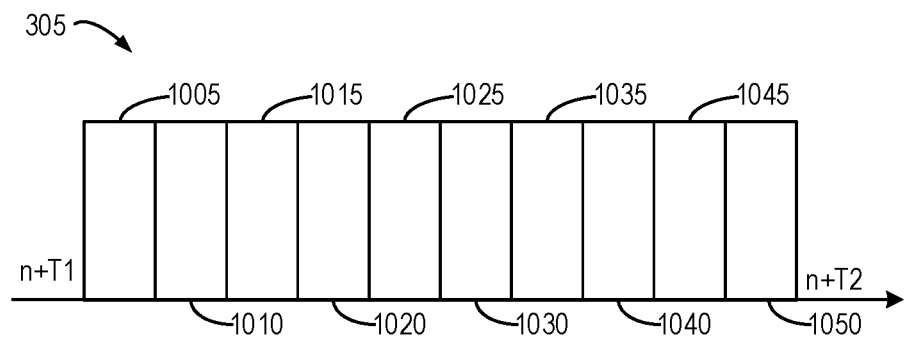
FIG. 10 illustrates an example of a time interval for selecting a set of target slots for partial sensing in accordance with some embodiments of the present disclosure.

FIG. 10 illustrates an example of the time interval 305 for selecting a set of target slots for partial sensing in accordance with some embodiments of the present disclosure. As shown in FIG. 10, if the terminal device 120 is triggered to perform resource sensing at slot n, then the terminal device 120 can determine the time interval 305 from slot n+T1 to slot n+T2. In some embodiments, selection of $T_1$ is up to UE implementation under $0 \leq T_1 \leq T_{proc,1}$, where $T_{proc,1}$ is the UE processing time configured from higher layer. In addition, if $T_{2min}$ is shorter than the remaining packet delay budget (in slots) then $T_2$ is up to UE implementation subject to $T_{2min} \leq T_2 \leq$ remaining packet budget (in slots); otherwise $T_2$ is set to the remaining packet delay budget (in slots).

In the example of FIG. 10, the time interval 305 includes ten slots, namely, slots 1005, 1010, 1015, 1020, 1025, 1030, 1035, 1040, 1045, and 1050, in which the slot 1005 may be selected as the target slot 310 in FIGS. 3, 8, and 9. However, in some other embodiments, any of the slots 1005 to 1050 may be selected by the terminal device 120 as the target slot 310. In some further embodiments, any one or more of the slots 1005 to 1050 may be selected as target slots including the target slot 310. Usually, the number of slots in the time interval 305 may be greater or equal to a predefined threshold from a higher layer which indicates the minimum number of sidelink slots that are included in the possible candidate resources. However, due to possible HARQ retransmissions which consume the packet delay budget and a possible strict delay requirement (as low as 3 ms), there is a possibility that the number of slots in the time interval 305 is less than the predefined threshold. In this event, the terminal device 120 may perform another operation instead of selecting the set of target slots from the time interval 305. This is further described below with reference to FIG. 11.

Figure 11:
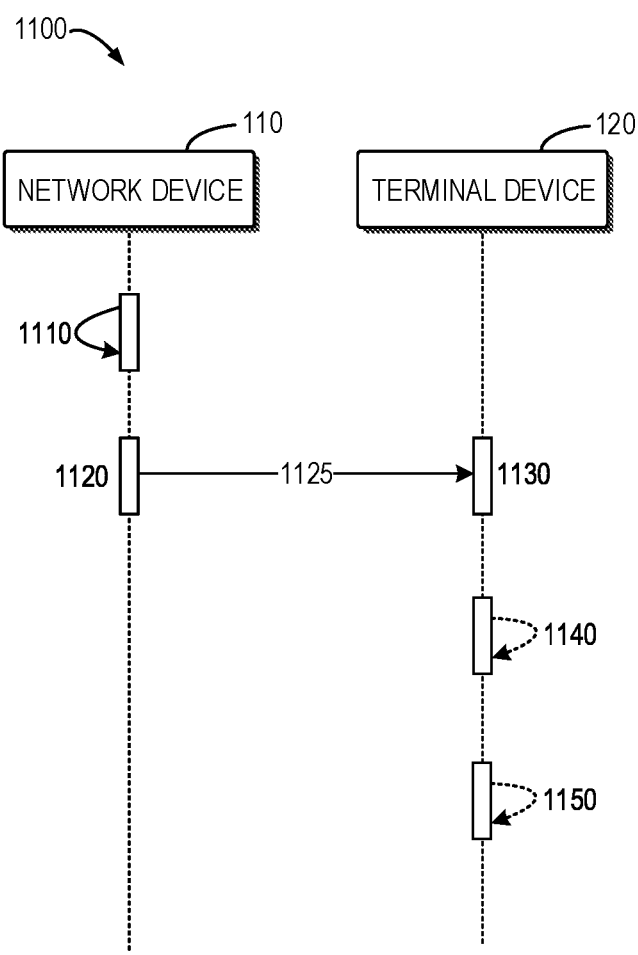
FIG. 11 illustrates another example communication process between a network device and a terminal device in accordance with some embodiments of the present disclosure.

FIG. 11 illustrates another example communication process 1100 between the network device 110 and the terminal device 120 in accordance with some embodiments of the present disclosure. For the purpose of discussion, the communication process 1100 will be described with reference to FIG. 1. However, it would be appreciated that the communication process 1100 may be equally applicable to other communication scenarios where a network device and a terminal device communicate with each other.

As shown in FIG. 11, the network device 110 may determine at 1110 a sixth higher layer parameter 1125, which indicates the predefined threshold for the number of slots in the time interval 305 for the terminal device 120 to select the set of target slots for the partial sensing. In some embodiments, the sixth higher layer parameter 1125 can also be referred to as "minNumCandidateSlot" and may have integer values, for example, (1, 2, . . . , 32). Each of the values represents the predefined threshold of a particular number of slots.

In some embodiments, the sixth higher layer parameter 1125 may be predefined, for example, by the network device 110 and may be transmitted to the terminal device 120 via an RRC message. In some other embodiments, the sixth higher layer parameter 1125 can be configured by the network device 110 and may be carried in any other existing or future signaling or messages. After determining at 1110 the sixth higher layer parameter 1125, the network device 110 may transmit at 1120 the sixth higher layer parameter 1125 to the terminal device 120, for example, via an RRC message.

At the receiving side, the terminal device 120 may receive at 1130 the sixth higher layer parameter 1125 from the network device 110, and then obtain the predefined threshold from the sixth higher layer parameter 1125. If the number of slots in the time interval 305 is below the predefined threshold, the terminal device 120 may select at 1140 all the slots in the time interval 305 as the set of target slots. In other words, each sidelink slot in the time interval 305 is determined by the terminal device 120 as a target slot for performing the partial sensing. In this way, the maximum number of available slots can be selected by the terminal device 120 as target slots to sense more potential available resources.

Alternatively, the terminal device 120 may determine at 1150 that the partial sensing is disabled for the terminal device 120, and can switch to perform a full sensing procedure instead of the indicated partial sensing. In this way, more potential available resources can be sensed by the terminal device 120 using a full resource sensing procedure.

In some embodiments, various above higher layer parameters (such as, the first, second, third, fourth, fifth, and sixth higher layer parameters 225, 425, 525, 625, 725, and 1125) can be indicated in one or more RRC information elements (IEs) from a network device to a terminal device. For example, there can be defined IE SL-V2X-ResourceSelectionConfig for V2X related sidelink communication to indicate whether partial sensing is allowed for the V2X sidelink communication. This is configured for all the NR V2X UE as below.

```
Partialsensingenable  ENUMERATED {true}        OPTIONAL -- Need OR
If Partialsensingenable is configured with true,
another parameter should also be configured to UE,
V2X-partialSensingConfig                       SEQUENCE {
  minNumCandidateSlot                            INTEGER (1..32),
  gapCandidateSensingNR                          BIT STRING (SIZE(N_reservPeriod))
  candidateSensing                               BIT STRING (SIZE (32))
} OPTIONAL,                                    -- Need OR
``` where $N_{reservPeriod}$ is the number of allowed periods indicated by higher layer parameters reservationPeriodAllowed.

Figure 12:
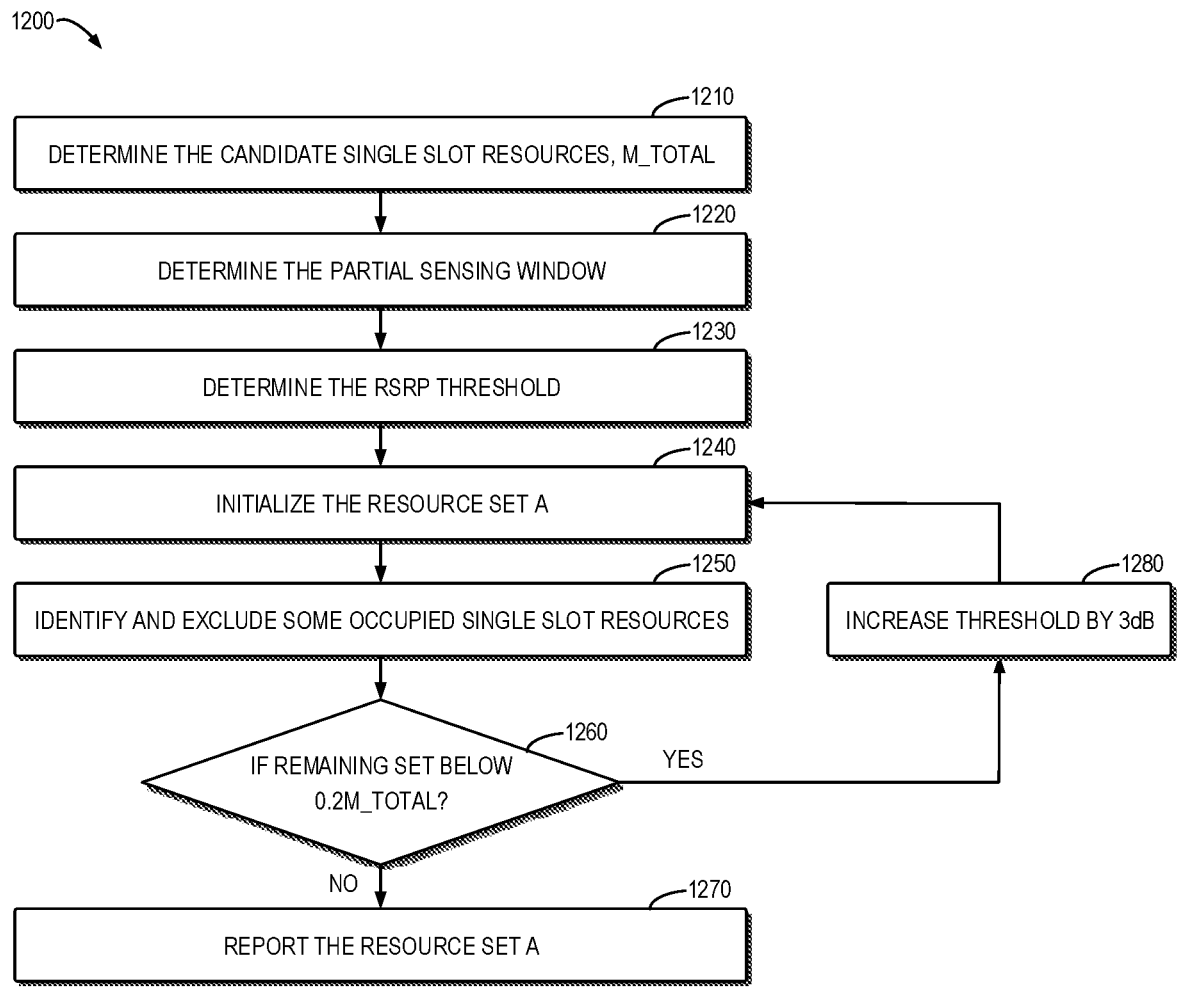
FIG. 12 illustrates a flowchart of an example method in accordance with some embodiments of the present disclosure.

FIG. 12 illustrates a flowchart of an example method 1200 in accordance with some embodiments of the present disclosure. In some embodiments, the method 1200 can be implemented at a terminal device, such as the first terminal device 120 as shown in FIG. 1. Additionally or alternatively, the method 1200 can also be implemented at the second terminal device 130 or other terminal devices not shown in FIG. 1. For the purpose of discussion, the method 1200 will be described with reference to FIG. 1 as performed by the terminal device 120 without loss of generality.

At block 1210 (Step 1), the terminal device 120 may determine the candidate single slot resources (which number is denoted as $M_{total}$) as follows.

If partial sensing is indicated by higher layer parameter partialsensingenable then the following steps are used:

(1) A candidate single-slot resource for transmission $R_{x,y}$ is defined as a set of $L_{subCH}$ contiguous sub-channels with sub-channel x+j in slot $t_y^{SL}$ where j=0, . . . , $L_{subCH}$−1. The UE shall determine by its implementation a set of slots which consists of at least Y slots within the time interval [n+$T_1$, n+$T_2$] correspond to one candidate single-slot resource, where:

(1.1) Selection of $T_1$ is up to UE implementation under 0≤$T_1$≤$T_{proc,1}$ where $T_{proc,1}$ is the UE processing time configured from higher layer;

(1.2) If $T_{2min}$ is shorter than the remaining packet delay budget (in slots) then $T_2$ is up to UE implementation subject to $T_{2min}$≤$T_2$≤remaining packet budget (in slots); otherwise $T_2$ is set to the remaining packet delay budget (in slots).

(1.3) UE selection of Y shall be greater than or equal to the high layer parameter minNumCandidateSlot which indicates the minimum number of sidelink slots that are included in the possible candidate resources (1.4) If slots number within [n+$T_1$, n+$T_2$] is less than minNumCandidateSlot, then UE assumes all the slots within [n+$T_1$, n+$T_2$] as candidate resources. Alternatively, UE assumes that partial sensing is disable, i.e., switches to perform full sensing procedure.

(2) The UE shall assume that any set of $L_{subCH}$ contiguous sub-channels included in the corresponding PSSCH resource pool within the determined set of slots correspond to one candidate single-slot resource. The total number of the candidate single-subframe resources is denoted by $M_{total}$.

At block 1220 (Step 2), the terminal device 120 may determine the partial sensing window as follows.

If a slot $t_y^{SL}$ is included in the set of slots in Step 1, the UE shall monitor any slot $t_{y-k}^{SL}$.

(1) When higher layer parameter t0_SensingWindow is configured with 1000+[100] ms:

(1.1) For the periodic traffic reservation:

Option 1, the UE shall monitor any slot $t_{y-k}^{SL}$ where k=$P'_1$, $P'_2$, . . . , $P'_n$. The set of allowed period values configured from higher layer parameter reservationPeriodAllowed is $P_1, P_2, \ldots, P_n$ which can be converted from units of ms to units of logical slots, resulting in=$P'_1, P'_2, \ldots, P'_n$.

Alternatively, in addition, the UE shall monitor any slot $t_{y-k}^{SL}$ where k=($P'_1, P'_2, \ldots, P'_n$)+(1, 2, . . . , 32).

Optional, the UE shall monitor any slot $t_{y-k}^{SL}$ where k=($P'_1, P'_2, \ldots, P'_n$)+m if m-th bit of the high layer parameter 32-bit bitmap candidateSensing is set to 1, where candidateSensing indicates which slots of the 32 slots should be sensed.

Option 2, the UE shall monitor any slot $t_{y-k}^{SL}$ where k=$P'_n$ if n-th bit of the high layer parameter gapCandidateSensingNR is set to 1.

Alternatively, in addition, the UE shall monitor any slot $t_{y-k}^{SL}$ where k=$P'_n$+(1, 2, . . . , 32) if n-th bit of the high layer parameter gapCandidateSensingNR is set to 1.

Optional, the UE shall monitor any slot $t_{y-k}^{SL}$ where k=$P'_n$+m if n-th bit of the high layer parameter gapCandidateSensingNR is set to 1 and m-th bit of the high layer parameter 32-bit candidateSensing is set to 1.

(1.2) In addition to the periodic traffic, for the aperiodic traffic reservation:

Additionally, the UE shall monitor any slot $t_{y-k}^{SL}$ where k=1, 2, . . . , 32.

Optional, the UE shall monitor slot $t_{y-k}^{SL}$ if k-th bit of the high layer parameter 32-bit candidateSensing is set to 1.

(2) When higher layer parameter t0_Sensing Window is configured with [100] ms:

Option 1, UE shall monitor any slot $t_{y-k}^{SL}$ where k=1, 2, . . . , 32.

Option 2, UE shall monitor any slot $t_{y-k}^{SL}$ if k-th bit of the high layer parameter 32-bit candidateSensing is set to 1.

(3) The UE shall perform the behavior in the following steps based on PSSCH decoded and RSRP measured in these slots.

At block 1230 (Step 3), the internal parameter $Th_{(pi)}$ is set to the corresponding value from higher layer parameter SL-ThresRSRP_pi_pj for pj equal to the given value of $prio_{TX}$ and each priority value pi. SL-ThresRSRP_pi_pj: this higher layer parameter provides an RSRP threshold for each combination pi, pj, where pi is the value of the priority field in a received SCI format 0-1 and pj is the priority of the transmission of the UE selecting resources; for a given invocation of this procedure, $pj=prio_{TX}$.

At block 1240 (Step 4), the set $S_A$ is initialized to the set of all the candidate single-slot resources.

At block 1250 (Step 5), the terminal device 120 may identify and exclude some occupied single slot resources.

For example, the UE shall exclude any candidate single-slot resource $R_{x,y}$ from the set $S_A$ if it meets all the following conditions:

a. the UE receives an SCI format 0-1 in slot $t_m^{SL}$, and "Resource reservation period" field, if present, and "Priority" field in the received SCI format 0-1 indicate the values $P_{rsvp\_RX}$ and $prio_{RX}$. The resource reservation interval, $P_{rsvp\_TX}$, if provided is converted from units of ms to units of logical slots, resulting in $P'_{rsvp\_TX}$.

b. the RSRP measurement performed for the received SCI format 0-1 is higher than $Th_{(prio_{RX})}$.

c. the SCI format received in slot $t_m^{SL}$ or the same SCI format which, if and only if the "Resource reservation period" field is present in the received SCI format 0-1, is assumed to be received in slot(s) $t_{m+q \times P'_{rsvp,RX}}^{SL}$ the set of resource blocks and slots which overlaps with $R_{x,y+j \times P_{rsvp,TX}}$ for q=1, 2, ..., Q and j=0, 1, ..., $C_{reset}$−1. Here, $P'_{rsvp,RX}$ is $P_{rsvp,RX}$ converted to units of logical slots, $$Q = \left\lceil \frac{T_{scal}}{P'_{rsvp\_RX}} \right\rceil$$

if $P'_{rsvp,RX} < T_{scal}$ and $n'-m \le P'_{rsvp\_RX}$, where $t_{n'}^{SL}=n$ if slot n belongs to the set $(t_0^{SL}, t_1^{SL}, \ldots, t_{max}^{SL})$, otherwise slot $t_{n'}^{SL}$ is the first slot after slot n belonging to the set $(t_0^{SL}, t_1^{SL}, \ldots, t_{max}^{SL})$; otherwise Q=1. $T_{scal}$ is FFS.

At block 1260 (Step 6), the terminal device 120 may determine if the number of resources in the remaining set is below $0.2M_{total}$. If the number of candidate single-slot resources remaining in the set $S_A$ is smaller than $0.2 \cdot M_{total}$, then at block 1280, $Th_{(pi)}$ is increased by 3 dB for each priority value $Th_{(pi)}$ and the procedure continues with the block 1240 (step 4).

At block 1270, the UE shall report set $S_A$ to higher layers.

Figure 13:
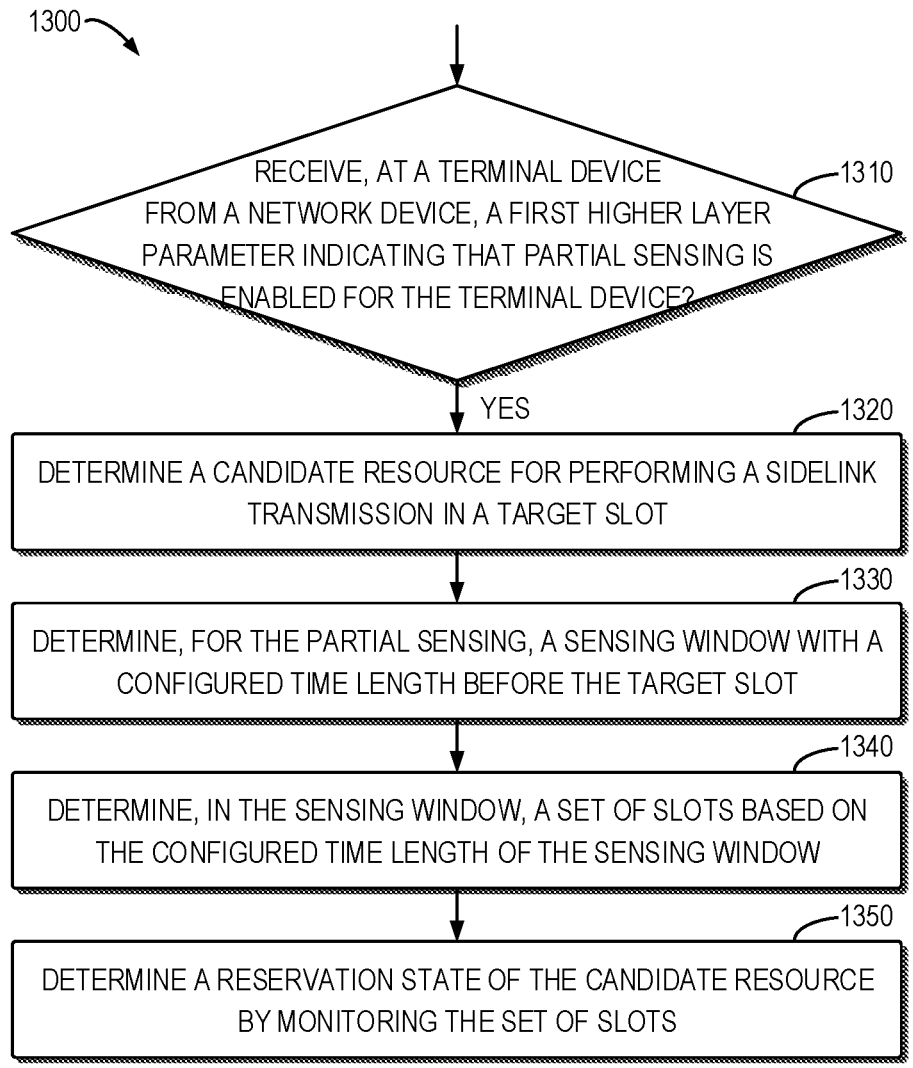
FIG. 13 illustrates a flowchart of another example method in accordance with some embodiments of the present disclosure.

FIG. 13 illustrates a flowchart of another example method 1300 in accordance with some embodiments of the present disclosure. In some embodiments, the method 1300 can be implemented at a terminal device, such as the first terminal device 120 as shown in FIG. 1. Additionally or alternatively, the method 1300 can also be implemented at the second terminal device 130 or other terminal devices not shown in FIG. 1. For the purpose of discussion, the method 1100 will be described with reference to FIG. 1 as performed by the terminal device 120 without loss of generality.

At block 1310, the terminal device 120 determines whether a first higher layer parameter indicating that partial sensing is enabled for the terminal device 120 is received from the network device 110. At block 1320, if the first higher layer parameter is received from the network device 110 and indicates that the partial sensing is enabled, the terminal device 120 determines a candidate resource for performing a sidelink transmission in a target slot. At block 1330, the terminal device 120 determines, for the partial sensing, a sensing window with a configured time length before the target slot. At block 1340, the terminal device 120 determines, in the sensing window, a set of slots based on the configured time length of the sensing window. At block 1350, the terminal device 120 determines a reservation state of the candidate resource by monitoring the set of slots.

In some embodiments, determining the sensing window comprises: receiving a second higher layer parameter from the network device 110; and determining the configured time length of the sensing window from the second higher layer parameter, the configured time length being selected from a plurality of time lengths available for the sensing window.

In some embodiments, determining the set of slots comprises: receiving a third higher layer parameter from the network device 110; in accordance with a determination that the configured time length is a first predefined value, determining a resource reservation period from the third higher layer parameter; and determining a first slot in the set of slots based on the resource reservation period and the target slot.

In some embodiments, the method 1300 further comprises: determining, as slots in the set, consecutive slots in the sensing window preceding the first slot.

In some embodiments, the method 1300 further comprises: determining consecutive slots in the sensing window preceding the first slot; receiving, from the network device 110, a fourth higher layer parameter indicating a portion of the consecutive slots; and determining the portion of the consecutive slots as slots in the set.

In some embodiments, determining the resource reservation period comprises:

determining, from the third higher layer parameter, a set of resource reservation periods including the resource reservation period.

In some embodiments, the method 1300 further comprises: receiving, from the network device 110, a fifth higher layer parameter indicating a subset of the set of resource reservation periods; and determining slots in the set, based on the subset of resource reservation periods and the target slot.

In some embodiments, determining the set of slots comprises: determining, as slots in the set, consecutive slots in the sensing window preceding the target slot.

In some embodiments, determining the set of slots comprises: determining consecutive slots in the sensing window preceding the target slot; receiving, from the network device 110, a fourth higher layer parameter indicating a portion of the consecutive slots; and determining the portion of the consecutive slots as slots in the set.

In some embodiments, determining the set of slots comprises: in accordance with a determination that the configured time length is a second predefined value, determining consecutive slots in the sensing window preceding the target slot as the set of slots.

In some embodiments, determining the set of slots comprises: in accordance with a determination that the configured time length is a second predefined value, determining consecutive slots in the sensing window preceding the target slot; receiving, from the network device 110, a fourth higher layer parameter indicating a portion of the consecutive slots; and determining the portion of the consecutive slots as the set of slots.

In some embodiments, the method 1300 further comprises: in accordance with a determination that the configured time length is a second predefined value, determining that the partial sensing is disabled for the terminal device 120.

In some embodiments, the method 1300 further comprises: selecting, from a time interval including a number of slots, a set of target slots including the target slot.

In some embodiments, the method 1300 further comprises: receiving, from the network device 110, a sixth higher layer parameter indicating a predefined threshold; and in accordance with a determination that the number of slots in the time interval is below the predefined threshold, selecting all the slots in the time interval as the set of target slots, or determining that the partial sensing is disabled for the terminal device 120.

Figure 14:
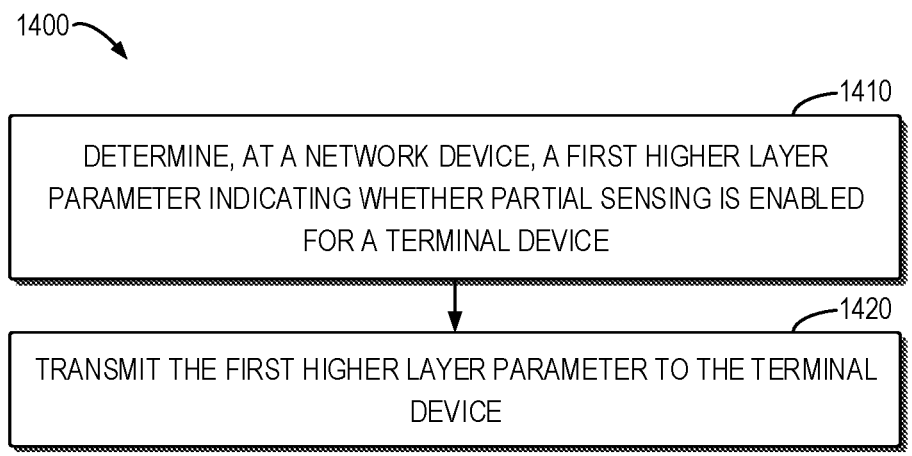
FIG. 14 illustrates a flowchart of another example method in accordance with some embodiments of the present disclosure.

FIG. 14 illustrates a flowchart of another example method 1400 in accordance with some embodiments of the present disclosure. In some embodiments, the method 1400 can be implemented at a network device, such as the network device 110 as shown in FIG. 1. Additionally or alternatively, the method 1400 can also be implemented at other network devices not shown in FIG. 1. For the purpose of discussion, the method 1400 will be described with reference to FIG. 1 as performed by the network device 110 without loss of generality.

At block 1410, the network device 110 determines a first higher layer parameter indicating whether partial sensing is enabled for the terminal device 120. At block 1420, the network device 110 transmits the first higher layer parameter to the terminal device 120.

In some embodiments, the method 1400 further comprises: selecting a configured time length from a plurality of time lengths available for a sensing window for the partial sensing; and transmitting, to the terminal device 120, a second higher layer parameter indicating the configured time length of the sensing window.

In some embodiments, the method 1400 further comprises: determining a third higher layer parameter indicating a set of resource reservation periods for the partial sensing; and transmitting the third higher layer parameter to the terminal device 120.

In some embodiments, the method 1400 further comprises: determining a fifth higher layer parameter indicating a subset of the set of resource reservation periods; and transmitting the fifth higher layer parameter to the terminal device 120.

In some embodiments, the method 1400 further comprises: determining a fourth higher layer parameter indicating a portion of consecutive slots in the sensing window; and transmitting the fourth higher layer parameter to the terminal device 120.

In some embodiments, the method 1400 further comprises: determining a sixth higher layer parameter indicating a predefined threshold for the number of slots in a time interval for the terminal device 120 to select a set of target slots for the partial sensing; and transmitting the sixth higher layer parameter to the terminal device 120.

Figure 15:
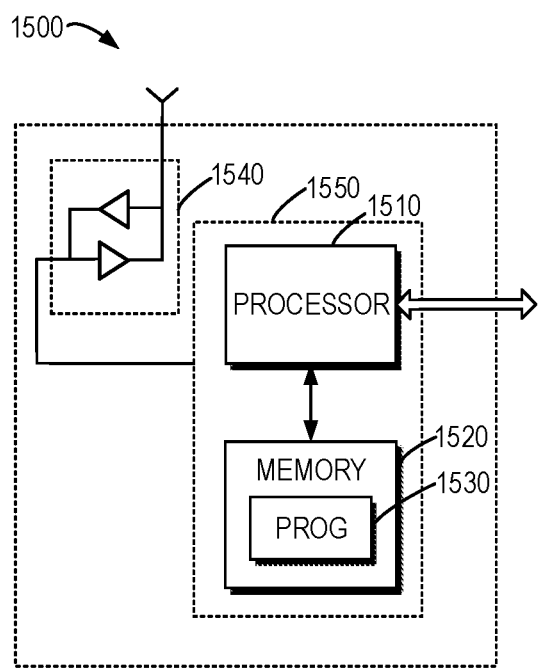
FIG. 15 is a simplified block diagram of a device that is suitable for implementing some embodiments of the present disclosure.

FIG. 15 is a simplified block diagram of a device 1500 that is suitable for implementing some embodiments of the present disclosure. The device 1500 can be considered as a further example embodiment of the first terminal device 120, the second terminal device 130, and the network device 110 as shown in FIG. 1. Accordingly, the device 1500 can be implemented at or as at least a part of the first terminal device 120, the second terminal device 130, and the network device 110.

As shown, the device 1500 includes a processor 1510, a memory 1520 coupled to the processor 1510, a suitable transmitter (TX) and receiver (RX) 1540 coupled to the processor 1510, and a communication interface coupled to the TX/RX 1540. The memory 1520 stores at least a part of a program 1530. The TX/RX 1540 is for bidirectional communications. The TX/RX 1540 has at least one antenna to facilitate communication, though in practice an Access Node mentioned in this application may have several ones. The communication interface may represent any interface that is necessary for communication with other network elements, such as X2 interface for bidirectional communications between gNBs or eNBs, S1 interface for communication between a Mobility Management Entity (MME)/Serving Gateway (S-GW) and the gNB or eNB, Un interface for communication between the gNB or eNB and a relay node (RN), or Uu interface for communication between the gNB or eNB and a terminal device.

The program 1530 is assumed to include program instructions that, when executed by the associated processor 1510, enable the device 1500 to operate in accordance with the embodiments of the present disclosure, as discussed herein with reference to FIGS. 12 to 14. The embodiments herein may be implemented by computer software executable by the processor 1510 of the device 1500, or by hardware, or by a combination of software and hardware. The processor 1510 may be configured to implement various embodiments of the present disclosure. Furthermore, a combination of the processor 1510 and memory 1520 may form processing means 1550 adapted to implement various embodiments of the present disclosure.

The memory 1520 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1520 is shown in the device 1500, there may be several physically distinct memory modules in the device 1500. The processor 1510 may be of any type suitable to the local technical network, and may include one or more of general purpose computers, special purpose computers, microprocessors, digital signal processors (DSPs) and processors based on multicore processor architecture, as non-limiting examples. The device 1500 may have multiple processors, such as an application specific integrated circuit chip that is slaved in time to a clock which synchronizes the main processor.

The components included in the apparatuses and/or devices of the present disclosure may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the units in the apparatuses and/or devices may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 12 to 14. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific embodiment details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for a terminal device, the method comprising:
    obtaining a first higher layer parameter that enables a partial sensing and a second higher layer parameter for configuring a time length of a sensing window; and
    in a case where the terminal device receives the first higher layer parameter, monitoring, within the sensing window having the configured time length before a candidate slot for a sidelink transmission, slots that precede the candidate slot for the sidelink transmission.

2. A terminal comprising a processor configured to:
    obtain a first higher layer parameter that enables a partial sensing and a second higher layer parameter for configuring a time length of a sensing window; and
    in a case where the terminal device receives the first higher layer parameter, monitor, within the sensing window having the configured time length before a candidate slot for a sidelink transmission, slots that precede the candidate slot for the sidelink transmission.

* * * * *